United States Patent [19]
Khan

[11] Patent Number: 5,404,838
[45] Date of Patent: Apr. 11, 1995

[54] AUTOMATIC PET FEEDER

[76] Inventor: Osman M. Khan, 16314 E. Vaughn, Gilbert, Ariz. 85234

[21] Appl. No.: 279,535

[22] Filed: Jul. 26, 1994

[51] Int. Cl.⁶ .......................................... A01K 39/012
[52] U.S. Cl. ..................................... 119/52; 119/51.5; 119/57.8
[58] Field of Search ............... 119/51.5, 52.1, 57.8, 119/57.9, 52.2

[56] References Cited

U.S. PATENT DOCUMENTS

| | | |
|---|---|---|
| 1,822,289 | 9/1931 | Helmers . |
| 1,895,435 | 1/1933 | Ahrens ................... 119/52.1 |
| 2,746,423 | 5/1956 | Runion ................... 119/52.1 |
| 4,007,711 | 2/1977 | Michael . |
| 4,034,715 | 7/1977 | Arner ..................... 119/51.5 |
| 4,315,483 | 2/1982 | Scheidler ............... 119/51.5 |
| 4,327,669 | 3/1982 | Blasbalg . |
| 4,355,598 | 10/1982 | Saylor .................... 119/52.1 |
| 4,498,423 | 2/1985 | Gainsboro . |
| 4,699,089 | 10/1987 | Teshke . |
| 4,721,063 | 1/1988 | Atchley .................. 119/52.1 |
| 4,840,143 | 6/1989 | Simon ..................... 119/52.1 |
| 4,896,628 | 1/1990 | Kadunce . |
| 5,033,411 | 7/1991 | Brucker . |
| 5,105,765 | 4/1992 | Loken . |
| 5,195,460 | 3/1993 | Loken . |
| 5,230,301 | 7/1993 | Nass . |
| 5,235,935 | 8/1993 | Edwards . |
| 5,345,892 | 9/1994 | Khan ...................... 119/52.1 |

FOREIGN PATENT DOCUMENTS 1052064 1/1954 France .

Primary Examiner—Paul J. Hirsch
Attorney, Agent, or Firm—John D. Lister

[57] ABSTRACT

An automatic pet feeder comprises a tubular food reservoir with a food replenishing port and a feeding port. The food replenishing port is in the upper end of the food reservoir and is sealed with a cap when in use. The feeding port is located adjacent the lower end of the food reservoir and has a pivotally mounted cover plate, sealing its otherwise open end, that can be pivoted out of the way by a pet to gain access to food in the feeding port. The bottom wall of the food reservoir is inclined to cause the food within the food reservoir to flow into the feeding port as food is consumed by the pet. The automatic pet feeder has an offset handle for suspending the pet feeder that helps to maintain the pet feeder level and a removable support stand that permits the pet feeder to be placed on the ground. A supplemental cup is also provided for water, trial foods and the like.

15 Claims, 2 Drawing Sheets

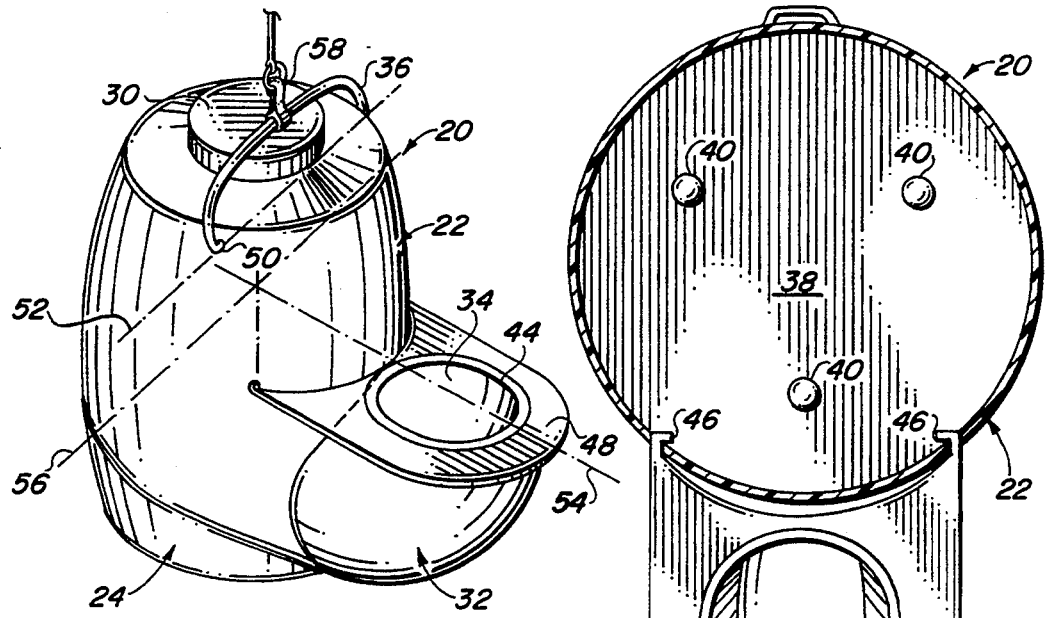
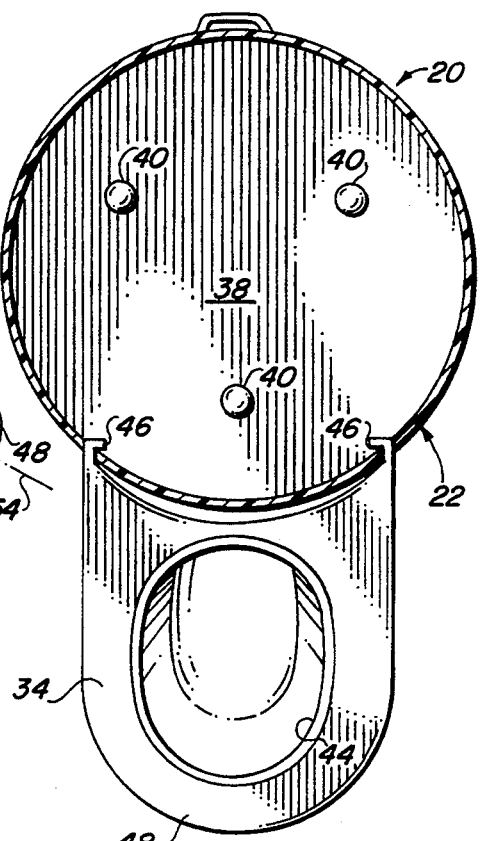
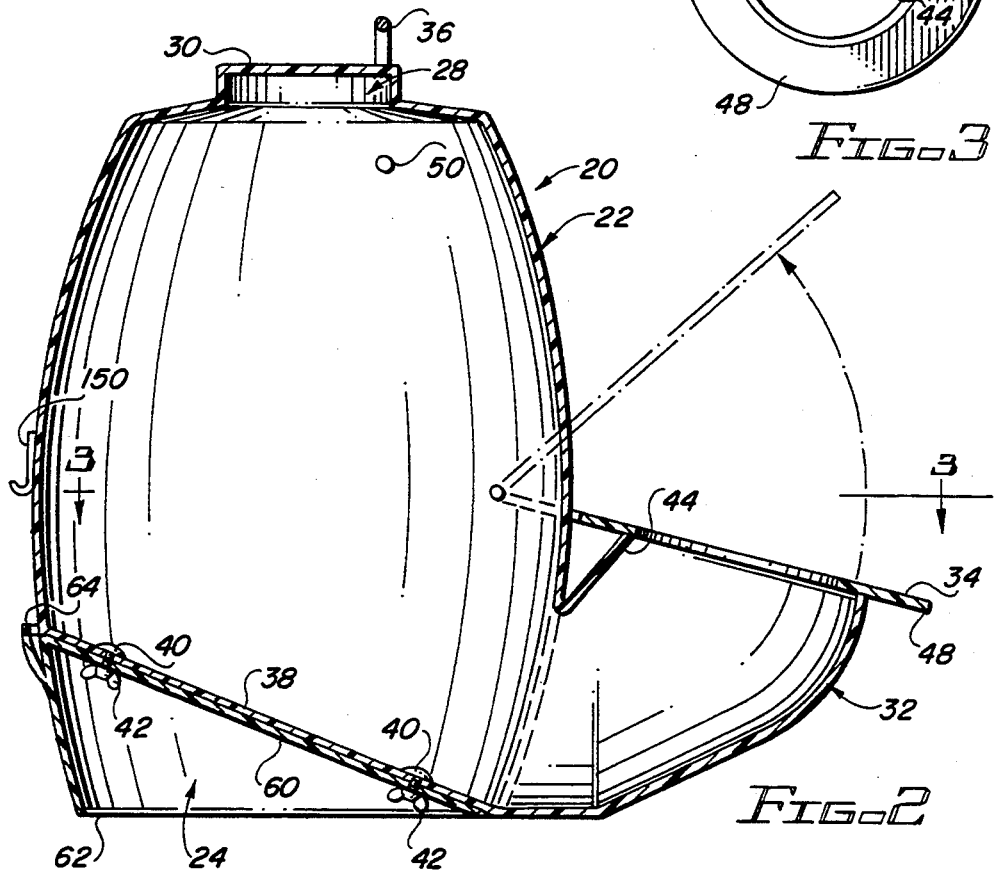

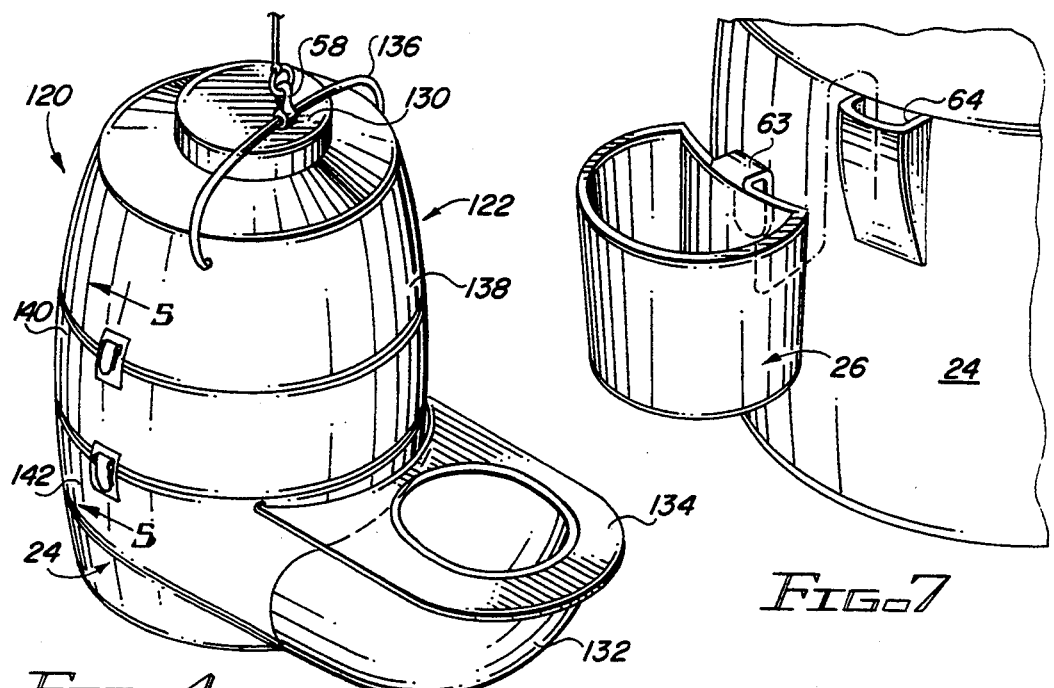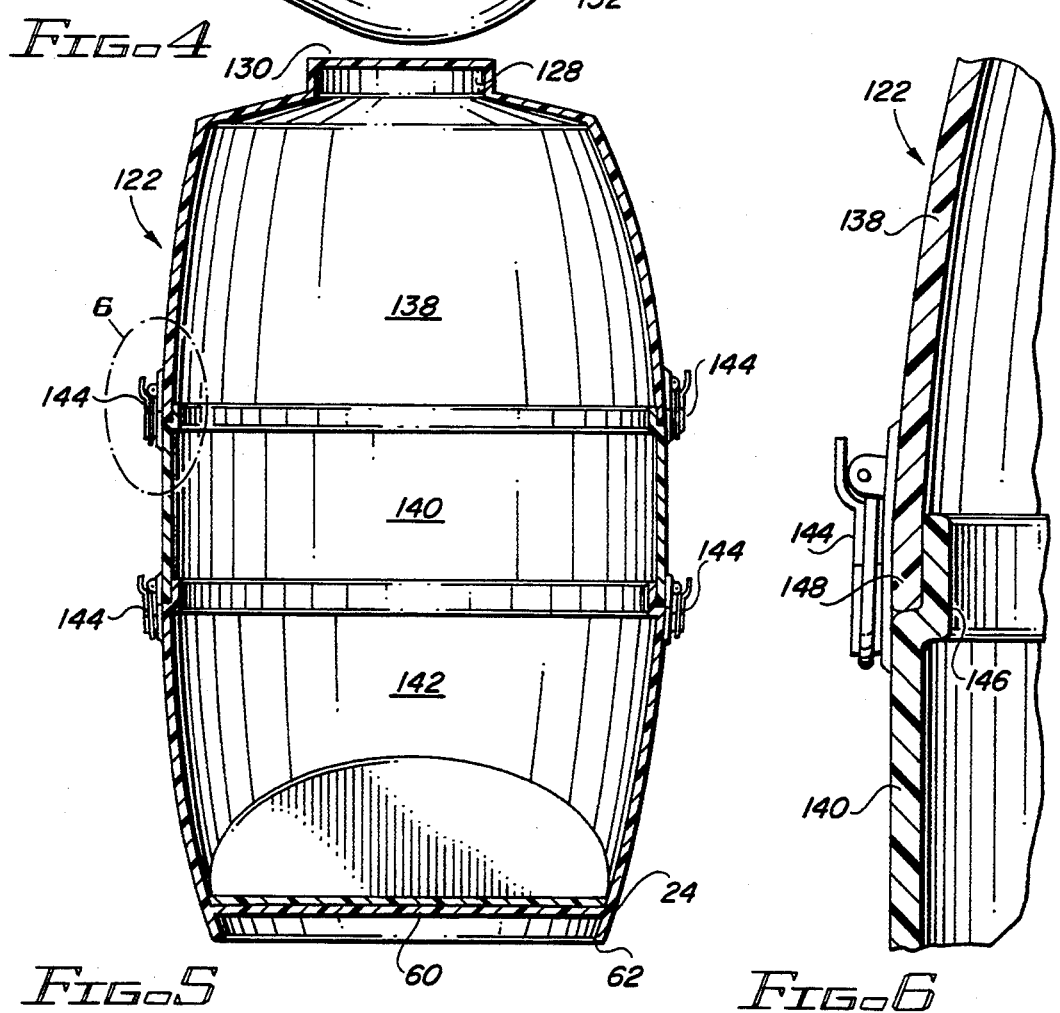

AUTOMATIC PET FEEDER

BACKGROUND OF THE INVENTION

The present invention is directed to an automatic pet feeder and, in particular, to an automatic pet feeder of the type which is disclosed in my patent application Ser. No. 08/204,945; filed on Mar. 2, 1994; and entitled "Automatic Pet Feeder", now U.S. Pat. No. 5,345,892; for which the issue fee has been paid and which is hereby incorporated herein by reference in its entirety (hereinafter the application Ser. No. 08/204,945, now U.S. Pat. No. 5,345,892). The automatic pet feeder of the present invention can be used either indoors or outdoors for dogs, cats and other pets and is reliable, convenient to use, hygienic, economical and easy to assemble or disassemble for cleaning, storage, packaging and/or transport.

The automatic pet feeder of the present invention is designed to dispense the dry, pelletized pet food that is commonly available to pet owners at pet and grocery stores throughout the country. Preferably, the capacity of the food reservoir of the automatic pet feeder can be varied by adding or removing sections of the reservoir. Thus, the food reservoir of the automatic pet feeder can hold enough food for several days, a week or if desired, even longer. Of course, if a pet owner is planning to be absent for more than a day, a neighbor, friend or relative should be asked to periodically check on the pet to be sure that the pet's food supply and other needs are being met. The automatic pet feeder provides a reliable, convenient means to assure that a pet will have food during temporary absences by the pet owner.

Both the food replenishing port and the feeding port of the automatic pet feeder are sealed thereby sealing the food reservoir of automatic pet feeder. Since the automatic pet feeder of the present invention is sealed, the automatic pet feeder is hygienic and protects the pelletized pet food from contamination and/or moisture due to rain, snow, mice, birds, ants, other insects and dust. This enables pet food to be held within the automatic pet feeder for extended periods of time without fear that the pet food will become unsuitable for consumption by a pet.

The feeding port is located adjacent a lower end of the food reservoir and the bottom wall of the food reservoir is inclined toward the feeding port to cause additional pelletized food within the food reservoir to flow into the feeding port as the food in the feeding port is consumed by a pet. At least a portion of and, preferably, the entire food reservoir and feeding port of the automatic pet feeder of the present invention are transparent so that the level and remaining quantity of food in the food reservoir and the availability of food in the feeding port can be easily determined, even at a distance, by directly viewing the amount of pet food remaining in the automatic pet feeder. Thus, when a pet is housed in a pen or kennel, the amount of food available for the pet can be determined from outside the pen. This adds to the convenience of using the automatic pet feeder, which is especially important when a neighbor, friend or relative has been asked to look after the pet(s).

Like the automatic pet feeder of the application Ser. No. 08/204,945 U.S. Pat. No. 5,345,892 (FIGS. 4A-4D), the automatic pet feeder of the present invention is designed to be suspended within a pen and can be readily removed from a pen to be replenished with food without the need for anyone to enter the pen. This feature, in combination with the use of a transparent food reservoir, makes the automatic pet feeder of the present invention easy and convenient to use, especially, when the pet owner is concerned that someone entering the pen might accidentally release the pet from the pen; when the pet is not accustomed to being handled by strangers; or the pet is a guard dog or otherwise unfriendly to strangers.

By suspending the automatic pet feeder, the height of the automatic pet feeder above the ground or floor (hereinafter "ground") can be adjusted to accommodate the size of the pet feeding from the automatic pet feeder. For larger pets, the automatic pet feeder can be raised. For smaller pets, the automatic pet feeder can be lowered. In addition, when a more controlled feeding of the pet is desired, the pet owner can easily raise the automatic pet feeder to a height where the automatic pet feeder is not available to the pet. This can be performed manually or through the use of a timer and an automatic winch or a winch operated by a remote control. A synchronized sounding, calling or announcing device may also be incorporated to announce that dinner has been seved.

As with the automatic pet feeder of the application Ser. No. 08/204,945, the automatic pet feeder of the present invention is designed to be either non-rotatably or rotatably suspended off the ground. When suspended in the non-rotatable mode, the automatic pet feeder is in a relatively stable, stationary position. When suspended in the rotatable mode, the automatic pet feeder rotates as the pet feeds and the pet must move with the feeding port of the automatic pet feeder to continue eating. This gives the pet a chance to play while the pet is feeding and can also discourage overeating by certain pets as the pet will have to move with the feeding port as the feeding port rotates.

In addition to being designed for suspension from a ceiling, joist, beam, tree limb, door frame or some other horizontally extending member located some distance off the ground, the automatic pet feeder of the present invention can also be mounted on a support stand and placed on the ground for feeding. The automatic pet feeder does not rotate in the support stand, but the ability of the automatic pet feeder to be mounted on a support stand increases the versatility of the pet feeder and enables the pet feeder to be used in locations where the pet feeder can not be suspended. The support stand also permits the use of a supplemental cup on the automatic pet feeder.

The automatic pet feeder of the present invention can be made from plastics, fiberglass reinforced plastics, or other similar inexpensive and durable materials. Accordingly, the automatic pet feeder of the present invention is inexpensive, durable and easy to clean. The automatic pet feeder has very few moving parts which minimizes any chance that the automatic pet feeder might malfunction. In addition, due to the design of the automatic pet feeder, the components of the automatic pet feeder are easy to fabricate and the automatic pet feeder can be easily assembled or disassembled within minutes without the use of tools. Thus, the automatic pet feeder of the present invention is easy to clean, assemble, disassemble, store, package and transport.

SUMMARY OF THE INVENTION

The automatic pet feeder of the present invention provides a means for feeding pets pelletized food over a period of time without fear that the pet food will become unsuitable for consumption. The automatic pet feeder comprises a tubular food reservoir with a food replenishing port for introducing pelletized food into the automatic pet feeder and a tubular feeding port for making the food available to the pet for consumption. The food replenishing port is in the upper end of the tubular food reservoir and is sealed with a removable cap when in use. The feeding port is located adjacent the lower end of the tubular food reservoir and has a pivotally mounted cover plate sealing its otherwise open end that can be pivoted out of the way by a pet to gain access to the food in the tubular feeding port. When the pet is through eating, the cover plate pivots back onto the open end of the feeding port to seal the feeding port while the pet is not feeding. A bottom wall of the tubular food reservoir is inclined toward the tubular feeding port to cause the pelletized food within the tubular food reservoir to flow into the tubular feeding port as pelletized food is consumed from the feeding port by a pet. Thus, the tubular feeding port remains charged with the pelletized food for the next feeding by the pet.

The automatic pet feeder has an offset handle for carrying the automatic pet feeder and for suspending the automatic pet feeder off the ground. The offset handle helps to maintain the pet feeder level even though the automatic pet feeder carries more food and thus more weight on the tubular feeding port side of the tubular food reservoir. Preferably, the offset handle includes a swivel so that the automatic pet feeder can be rotatably suspended above the ground and the pet will have to move with the rotating feeding port while feeding thereby making the feeding more interesting and fun for the pet.

The automatic pet feeder is detachably mounted on a generally wedge shaped support stand that has an upper inclined surface abutting an underside of the inclined bottom wall of tubular food reservoir and a bottom surface that is in a plane perpendicular to the vertical centerline of the automatic pet feeder. With the support stand attached to the bottom of the tubular food reservoir, the automatic pet feeder can be placed on the ground for feeding pets. The support stand is also provided with a slot for mounting a supplemental cup that can be used for water, trial foods and the like.

The automatic pet feeder is made of plastic, fiberglass reinforced plastic or other similar materials. In one embodiment, the automatic pet feeder of the present invention is made of transparent or translucent plastic to allow the viewing of the pelletized pet food within the automatic pet feeder. The automatic pet feeder can be made in one section or, to enable the capacity of the food reservoir to be changed, the automatic pet feeder can be made of three or more separable sections secured together by quick-release latches.

BRIEF DESCRIPTION OF THE DRAWINGS

FIG. 1 is a perspective view of one embodiment of the automatic pet feeder of the present invention.

FIG. 2 is a vertical section through the automatic pet feeder of FIG. 1, taken substantially along the diameter of the tubular food reservoir that bisects the tubular feeding port of the automatic pet feeder.

FIG. 3 is a horizontal section of the automatic pet feeder of FIG. 1, taken substantially along lines 3—3 of FIG. 2.

FIG. 4 is a perspective view of a second embodiment of the automatic pet feeder of the present invention.

FIG. 5 is a vertical section taken substantially along lines 5—5 of FIG. 4.

FIG. 6 is a detail, encircled in FIG. 5, of a latching mechanism and a joint between sections of the automatic pet feeder of FIG. 4.

FIG. 7 is a partial perspective of the automatic pet feeder of FIGS. 1 or 4 showing a supplemental cup and a cup mounting feature on a support stand of the automatic pet feeder of FIGS. 1 or 4.

DESCRIPTION OF THE PREFERRED EMBODIMENTS

The automatic pet feeder 20 or 120 of the present invention comprises three main components: a tubular food reservoir 22 or 122, a support stand 24, and a supplemental cup 26. The automatic pet feeder 20 or 120 can be made of fiberglass reinforced plastic, plastic, plexiglass or some other suitable material that, preferably, can be molded into the shapes of the three main components or the shapes of the parts forming the three main components. While the automatic pet feeder can be made of opaque materials, preferably, the automatic pet feeder 20 or 120 is either transparent or translucent so that the amount of pelletized food within the automatic pet feeder can be viewed from a distance without having to open the automatic pet feeder. Alternatively, only the lower half of the tubular food reservoir or only a vertical "see through strip" extending from the upper end to the lower end of the tubular food reservoir can be made transparent or translucent to permit the viewing of the amount of pelletized food within the automatic pet feeder. The automatic pet feeder 20 or 120 can also be made in various colors to match or suit any surroundings and to give the automatic pet feeder an aesthetically pleasing appearance. As used herein, the term translucent refers to a material which is clear enough to view whether or not food is within the automatic pet feeder and will include transparent materials.

As shown in FIGS. 1 to 3, the tubular food reservoir 22 of the automatic pet feeder 20 comprises an upper end with a tubular food replenishing port 28; a closure cap 30 for the food replenishing port; a tubular feeding port 32; a pivoting cover plate 34 for the tubular feeding port; and a handle 36. The tubular food reservoir 22 is preferably barrel shaped with a circular horizontal transverse cross-section. However the tubular food reservoir 22 may be six-sided, eight-sided, etc. When the tubular food reservoir 22 is made in one piece, as shown in FIGS. 1 to 3, the tubular food reservoir is typically about sixteen inches high and about twelve inches in diameter at its widest point which, typically, is somewhat more than nine inches below the upper end of the tubular food reservoir. A tubular food reservoir of these dimensions stores about twenty pounds of commercially available pelletized pet food. The diameter of the, preferably, barrel shaped tubular food reservoir 22 can be either increased or decreased from twelve inches to increase or decrease the food storage capacity of the tubular food reservoir for larger or smaller pets.

As shown in FIGS. 1 and 2, the tubular food replenishing port 28 is located in the upper end of the tubular food reservoir 22. The tubular food replenishing port 28 is preferably a collar, about four inches in diameter and three-quarters of an inch high, centrally located in the upper end of the tubular food reservoir 22.

The tubular food replenishing port 28 is sealed, except when introducing pelletized food into the tubular food reservoir, by the removable closure cap 30. The removable closure cap 30 fits over the collar of the tubular food replenishing port to keep rain, snow, flies, ants, other insects, dust and other contaminants out of the food being held in the tubular food reservoir 22. The removable closure cap 30 is typically held in place on the collar of the tubular food replenishing port 28 by a sliding-friction fit or spiral screw threads.

The lower end of the tubular food reservoir 22 has an inclined bottom wall 38 which is inclined downwardly toward the tubular feeding port 32 to cause pelletized food within the tubular food reservoir to flow into the tubular feeding port 32 as food is consumed from the tubular feeding port by a pet and thereby maintain a desired level of pet food within the tubular feeding port 32 for the pet. The inclined bottom wall must be inclined downwardly from the horizontal at an angle of at least 15° to cause the pelletized pet food to flow into the tubular feeding port. However, an angle of at least 22° is required to obtain an effective flow of the pelletized pet food into the tubular feeding port 32 and, preferably, an angle of about 27° is desired for the most effective flow of pelletized pet food into the tubular feeding port 32. It is not desirable to increase the angle of inclination of the bottom wall 38 very far above 27° as this will reduce the capacity of the tubular food reservoir 22 without appreciably increasing the effectiveness of the pelletized pet food delivery to the tubular feeding port 32.

The tubular food reservoir 22 is provided with fastening means, preferably, in the bottom wall 38, for securing the support stand 24 to the underside of the bottom wall 38 and, thus, to the tubular food reservoir 22 to enable the automatic pet feeder to be placed on the ground. Preferably, the bottom wall 38 has three bolts 40 arranged in a triangular pattern, shown in FIG. 3; molded into the bottom wall 38; and extending downwardly from the bottom wall 38. The bolts 40 pass through aligned apertures in the upper wall of the support stand 24 and wing nuts 42 are used to secure the support stand 24 in place. While not shown, it is contemplated that quick release latches mounted on the sidewalls of the tubular food reservoir and the support stand could also be used to secure the support stand to the underside of the tubular food reservoir.

As shown in FIGS. 1 to 3, the tubular feeding port 32 extends outwardly and upwardly from the lower end of the tubular food reservoir and the lowermost point of the inclined bottom wall 38 of the tubular food reservoir 22. Preferably, the tubular feeding port extends outwardly and upwardly at an angle of about 45° to the horizontal, and has a generally oval shaped opening 44, measuring six inches by four and one-half inches, which is inclined downwardly from the horizontal at an angle of about 10° to 12°.

The tubular feeding port 32 is provided with a pivoted cover plate 34 that seals the opening 44 of the tubular feeding port 32 when a pet is not feeding from the automatic pet feeder 20. The cover plate is pivotally mounted on the sidewall of the tubular food reservoir 22 by projections 46 which fit into apertures provided in the tubular food reservoir sidewall. The outer peripheral edge 48 of the cover plate 34 extends beyond the outer peripheral edge of the opening 44 in tubular feeding port 32, preferably, by about one and one-half inches, to permit a pet to lift and pivot the cover plate 34 out of the way with its muzzle so that the pet can gain access to the food in the tubular feeding port for feeding. When the pet is through feeding and removes its muzzle from the tubular feeding port 32, the cover plate automatically pivots back into place upon the open end of the tubular feeding port thereby sealing the opening 44 to prevent water, snow, rain, flies, ants, other insects, dust and other contaminates from entering the tubular feeding port 32.

As shown in FIGS. 1 and 2, the automatic pet feeder 20 is provided with an offset handle 36 that is pivotally mounted on the tubular food reservoir 22. The offset handle 36 is typically made of three sixteenths inch diameter tensile metal and is arcuate shaped like a common bucket handle. The inturned ends of the offset handle 36 are each about three eighths of an inch long and, as shown in FIGS. 1 and 2, are received in holes 50 typically located in the sidewall of the tubular food reservoir 22 adjacent the upper end of the tubular food reservoir. The ends of the offset handle 36 are maintained in the holes 50 by the resiliency of the tensile metal of which the offset handle is made. The resiliency of the offset handle 36 causes the ends of the offset handle to spring back to their original spacing after being spread apart to be inserted in the holes 50.

The holes 50 are located along a chord 52 which intersects the sidewall of tubular food reservoir 22 below the upper edge of the sidewall of the tubular food reservoir. The chord 52 extends perpendicular to a diameter 54 of the tubular food reservoir which bisects the tubular feeding port 32 and is offset from (toward the tubular feeding port side of the tubular food reservoir) and parallel to a second diameter 56 of the tubular food reservoir that extends perpendicular to the first diameter 54. For the twenty pound capacity tubular food reservoir 22 discussed above, the chord 52 passing through the holes 50 is typically about one inch below the upper edge of the sidewall and offset about one inch from the second diameter 56 and the vertically extending centerline of the tubular food reservoir. As a result of the inclined bottom wall 38 of the tubular food reservoir and the tubular feeding port 32, the center of gravity of the automatic pet feeder 20 is offset toward the tubular feeding port side of the tubular food reservoir 22 due to the extra weight of the pet food carried on this side of the tubular food reservoir. Thus, by offsetting the handle 36 toward the tubular feeding port side of the tubular food reservoir 22, the offset handle 36 is positioned substantially, vertically above the center of gravity of the automatic pet feeder 20 and maintains the automatic pet feeder level when the automatic pet feeder 20 is suspended from the offset handle.

As shown in FIGS. 1 and 2, a swivel 58 is carried on the offset handle 36. When the automatic pet feeder is suspended from the swivel 58 by a braided rope or wire, the automatic pet feeder will rotate as the pet is feeding thereby making the feeding interesting and playful for the pet. The rotation of the automatic pet feeder 20 will also discourage a pet that likes to overeat, from overeating. By attaching the rope or wire directly to the offset handle 36 of the automatic pet feeder, the automatic pet feeder will not rotate.

The support stand 24 is generally wedge shaped and has an upper wall 60 which is inclined to the horizontal at the same angle as the inclined bottom wall 38 of the tubular food reservoir. As mentioned above, the upper wall 60 has three apertures therein which are aligned with and receive the bolts 40 of the tubular food reservoir to secure the support stand 24 to the bottom of the tubular food reservoir. Since wing nuts 42 are used to hold the support stand 24 on the bolts 40, if desired, the support stand 24 can be easily and quickly detached from the tubular food reservoir. The underside of the support stand 24 is generally open and the peripheral bottom edges 62 of the support stand lie in a horizontal plane which extends perpendicular to the vertically extending centerline of the tubular food reservoir so that the automatic pet feeder will be level when placed on the ground.

As shown in FIG. 7, the supplemental cup 26 is detachably mounted on the support stand 24 by a handle 63 that fits snugly into a slot 64 in the support stand 24. The supplemental cup is rounded at its base for easy cleaning and typically, has a base diameter of about four and one-half inches. The diameter of the supplemental cup gradually increases from the base of the cup to the upper rim of the cup 26. The height of the supplemental cup 26 on the handle side of the cup is typically about four inches and on the opposite side about five and seven-eighths inches. Due to the curvature of the sidewall of the support stand 24, when the cup handle 63 is inserted into the slot 64, the variation in the height of the supplemental cup from the handle side to the opposite side causes the upper rim of the supplemental cup to be substantially horizontal. The cup handle 63 is located at the upper rim of the supplemental cup and is typically about three and one-half inches long extending downwardly generally away from the side of the cup 26. The cup handle 63 typically measures about one and one-half by one-eighth of an inch in cross section which are substantially the dimensions of the slot 64. While not shown, it is contemplated that the supplemental cup could be provided with a pivotal cover plate similar to the cover plate 34 to prevent contaminates from entering the supplemental cup 26. The supplemental cup is intended to be used for wet food, semisolid food, milk or other liquids, trial foods, or vitamins on a daily basis.

In a second embodiment of the automatic pet feeder of the present invention, shown in FIGS. 4 to 6, the automatic pet feeder 120 comprises a tubular food reservoir 122, the support stand 24, and the supplemental cup 26. The tubular food reservoir includes a tubular food replenishing port 128 with a closure cap 130; a tubular feeding port 132 with a pivoted cover plate 134; and an offset handle 136. All of the components of the automatic pet feeder 120 are identical to the corresponding components of the automatic pet feeder 20 with the exception of the tubular food reservoir 122 which is formed in three or more sections.

As shown in FIGS. 4 and 5, the tubular food reservoir 122 comprises an upper section 138; an intermediate section 140; and a lower section 142. The sections 138, 140 and 142 are secured to adjacent sections by conventional quick release latching mechanisms 144 (typically four for each joint) which are spaced equidistantly about the circumferences of the sections 138, 140 and 142 of the tubular food reservoir 122. As shown best in FIG. 6, the joints between the sections 138, 140 and 142 each comprise an upper circumferential edge 146 of a lower section and a lower circumferential edge 148 of an upper section. The upper circumferential edge 146 of the lower section is offset inwardly to form a circumferential lip. The lower circumferential edge 148 of the upper section overlaps the upper circumferential edge of the lower section and rests on the circumferential lip to form a water tight joint which keeps the rain or other moisture out of the tubular food reservoir 122. While only three sections are shown, more sections can be used if greater increases in the capacity of the tubular food reservoir are desired.

A hook 150 can be provided on the side of the tubular food reservoir 22 or 122 for a bell. When a bell is placed on the hook it will ring when the pet is feeding.

In describing the invention certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An automatic pet feeder comprising:
a vertically extending tubular food reservoir with a vertically extending centerline; said tubular food reservoir having an upper end and a lower end; said upper end of said tubular food reservoir having a tubular food replenishing port for introducing food into said tubular food reservoir; said tubular food replenishing port having a removable cap which seals said tubular food replenishing port when the automatic pet feeder is in use; said lower end of said tubular food reservoir being closed by a bottom wall inclined at an angle of at least 15° to a horizontal plane extending perpendicular to the vertically extending centerline of said tubular food reservoir;

said tubular food reservoir having a tubular feeding port, adjacent said lower end, extending upwardly at an acute angle to the vertically extending centerline of said tubular food reservoir; said tubular feeding port having a cover plate for sealing an otherwise open end of said feeding port; said cover plate being pivotally mounted on said tubular food reservoir and having a peripheral outer edge extending beyond the otherwise open end of said feeding port whereby a pet can engage said peripheral outer edge and pivot said cover plate out of the way to gain access to food in said tubular feeding port and the said cover plate will pivot back to seal the otherwise open end of said tubular feeding port after the pet has fed;

said bottom wall of said tubular food reservoir being inclined downwardly in the direction of said tubular feeding port to cause food within said tubular food reservoir to flow into said tubular feeding port to replenish the food in the tubular feeding port as the food is consumed by the pet; and a handle means for suspending the automatic pet feeder above the ground.

2. The automatic pet feeder of claim 1, wherein: said bottom wall of said tubular food reservoir is inclined at an angle of at least 22° to the horizontal plane extending perpendicular to the vertically extending centerline of said tubular food reservoir.

3. The automatic pet feeder of claim 1, wherein: said bottom wall of said tubular food reservoir is inclined at an angle of about 27° to the horizontal plane extending perpendicular to the vertically extending centerline of said tubular food reservoir.

4. The automatic pet feeder of claim 1, wherein: said handle means is an offset handle; said offset handle being generally arcuate shaped and offset with respect to the vertically extending centerline of said tubular food reservoir; said offset handle having ends pivotally mounted in a sidewall of said tubular food reservoir adjacent said upper end of said tubular food reservoir; a chord, extending perpendicular to a diameter of said tubular food reservoir which bisects said tubular feeding port and offset with respect to said vertically extending centerline of said food reservoir in a direction toward said tubular feeding port, passes through the pivotally mounted ends of said offset handle whereby said offset handle compensates for a greater weight of food within the automatic pet feeder on a side of said tubular food reservoir having said tubular feeding port to help maintain the automatic pet feeder level when suspended from said offset handle.

5. The automatic pet feeder of claim 4, wherein: said offset handle includes a swivel to allow the automatic pet feeder to rotate about the vertically extending centerline of said tubular food reservoir when the automatic pet feeder is suspended from said offset handle.

6. The automatic pet feeder of claim 4, wherein: a generally wedge shaped support stand is removably secured to said bottom wall of said tubular food reservoir so that the automatic pet feeder can be placed on the ground; said support stand having an upper inclined surface which abuts an underside of said lower bottom wall of said tubular food reservoir and a bottom surface that extends in a plane perpendicular to the vertically extending centerline of said tubular food reservoir.

7. The automatic pet feeder of claim 6, wherein: said bottom wall of said tubular food reservoir is inclined at an angle of at least 22° to the horizontal plane extending perpendicular to the vertically extending centerline of said tubular food reservoir.

8. The automatic pet feeder of claim 6, wherein: said bottom wall of said tubular food reservoir is inclined at an angle of about 27° to the horizontal plane extending perpendicular to the vertically extending centerline of said tubular food reservoir.

9. The automatic pet feeder of claim 1, wherein: a generally wedge shaped support stand is detachably secured to said bottom wall of said tubular food reservoir so that the automatic pet feeder can be placed on the ground; said support stand having an upper inclined surface which abuts an underside of said lower bottom wall of said tubular food reservoir and a bottom surface that extends in a plane perpendicular to the vertically extending centerline of said tubular food reservoir.

10. The automatic pet feeder of claim 9, wherein: said handle means includes a swivel to allow the automatic pet feeder to rotate about the vertically extending centerline of said tubular food reservoir when the automatic pet feeder is suspended from said handle means.

11. The automatic pet feeder of claim 9, wherein: a supplemental cup is detachably mounted on said support stand at a location substantially, diametrically opposed to said tubular feeding port.

12. The automatic pet feeder of claim 1, wherein: said tubular food reservoir comprises a plurality of sections joined together by quick release mechanisms whereby the storage capacity of the automatic pet feeder can be easily changed.

13. The automatic pet feeder of claim 12, wherein: lower circumferential edges of upper sections of said plurality of sections overlap upper circumferential edges of lower sections of said plurality of sections to form watertight joints between said plurality of sections.

14. The automatic pet feeder of claim 1, wherein: said tubular food reservoir and said tubular feeding port are translucent so that the amount of food in the automatic pet feeder can be viewed.

15. The automatic pet feeder of claim 8, wherein: said tubular food reservoir and said tubular feeding port are translucent so that the amount of food in the automatic pet feeder can be viewed.

* * * * *